May 15, 1923.
N. V. TURNER
1,455,312
COOKING APPARATUS
Original Filed May 17, 1920
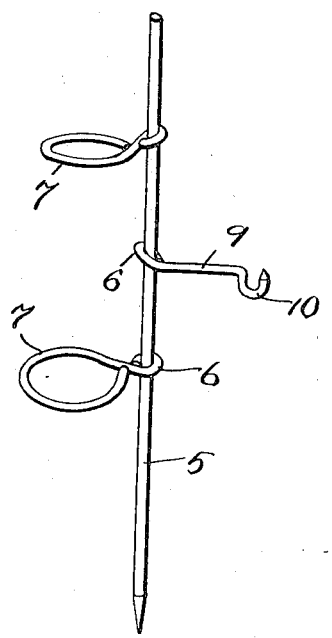
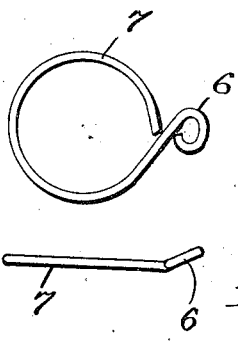
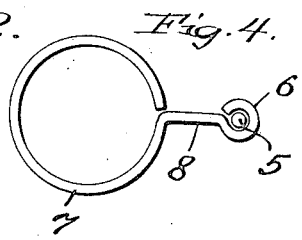
Nettie V. Turner, INVENTOR.
BY Richard B. Owen, ATTORNEY.

Patented May 15, 1923.

1,455,312

UNITED STATES PATENT OFFICE.

NETTIE V. TURNER, OF NEW SMYRNA, FLORIDA.

COOKING APPARATUS.

Application filed May 17, 1920, Serial No. 381,845.   Renewed July 3, 1922.   Serial No. 572,678.

*To all whom it may concern:*

Be it known that I, NETTIE V. TURNER, a citizen of the United States, residing at New Smyrna, in the county of Volusia and State of Florida, have invented certain new and useful Improvements in Cooking Apparatus, of which the following is a specification.

This invention relates to new and useful improvements in camping accessories and more particularly to a device which may be used for supporting cooking utensils and the like above a fire at any height thereto which may be desired.

An important object of the invention is to provide a vertically disposed supporting rod having slidably mounted thereon one or more pot or pan supporting members each of which is so formed and associated with the rod that the pot or pan supporting portion of said member is disposed in a horizontal plane when the pan supporting member is retained in its proper adjusted position, the pan holding members being of such a construction that they may be adjusted vertically upon the rod without necessitating the camper to grip said member with his bare hand, thereby obviating the possibility of the camper burning his hands when adjusting said member.

Another important object of the invention resides in the provision of a camp fire stake, and a plurality of cooking utensil supports which are adapted to be supported by the stake above the fire, the said utensil supports having their utensil supporting portions or ends arranged different distances from the stake when the utensil supports are associated therewith so that a large number of the supports can be arranged directly above one another and without interfering with the same, the utensils supported thereon or the amount of heat directed upon the utensils by the fire.

Another object of the invention is to provide a device of the above nature which is strong, durable, inexpensive to manufacture and highly efficient in practice.

Other objects and advantages of the invention will become apparent during the course of the following description.

In the accompanying drawings forming a part of the application and wherein like numerals are employed to designate like parts throughout the several views, Figure 1 is a perspective view of my invention.

Figure 2 is a top plan of one of the supporting elements.

Figure 3 is a side elevation of the same, and

Figure 4 is a top plan of a slightly modified form of supporting elements.

Referring to the accompanying drawings wherein for the purpose of illustration is shown the preferred embodiment of the invention, the numeral 1 designates a round metal stake or rod of any suitable proportions adapted to be driven into the ground and constituting the supporting means for the utensil holder. Any desired number of these utensil holders may be used, and in the drawings I have illustrated three, two being of the same type for supporting pans and the like while the other may be engaged with pot or kettle handle to support the same above the fire.

All of the utensil holders operate on the same principle, each being provided with a loop 6 formed at one extremity of a single length of rod or wire. The diameter of this loop is slightly larger than that of the rod or shank 5 so that the loop may readily be adjusted vertically thereof. The holder illustrated in Figures 2 and 3 is also provided with a much larger loop 7 by bending the other extremity of the rod, and it will be noted from Figure 3 that the smaller loop 6 is disposed at an angle to the larger loop 7 so that when a cooking utensil is supported upon the loop 7 this loop is disposed in a horizontal plane while the loop 6 is arranged obliquely to the longitudinal axis of the rod whereby opposite edges of the smaller loop 6 bind against the rod to prevent downward movement of the holder.

Another form of utensil holder is illustrated in Figure 4 and is provided with the two loops 6 and 7, but the larger loop 7 is arranged a distance from the smaller loop by the provision of a shank 8. This shank permits of the supporting portion of the holder being disposed directly over a fire. In Figure 1, still another form of the utensil holder is illustrated, and is provided with a loop 6 which is disposed at an angle to an outstanding shank 9 which terminates in an upwardly directed hook portion 10.

It will be appreciated that all of the utensil holders are formed from a single piece of rod or wire, the loops 6 arranged at an angle to the utensil engaging portion of said member, and that the utensil engaging portion of said holder is heavier that their stake engaging loops and consequently when the utensil holders are positioned upon the rod, the utensil engaging portions thereof will at once drop to a horizontal position to cause its respective loop 6 to bind upon the stake.

By reason of the fact that the utensil supporting portions or ends of the various utensil supports being arranged different distances from their respective stake engaging loops, it will be appreciated that a large number of the utensil supports can be associated with a single stake 5 with the utensil supporting portions or ends arranged one above the other and in such a manner that the utensil supports and the utensils carried thereby will not interfere with the other supports or utensils mounted thereon or even deflect the heat from the fire from the receptacles carried by supports arranged above the lowermost support. This will be appreciated by referring to Fig. 1 and assuming that a pot or pan is supported upon the lowermost support and it is desired to support a kettle or other utensil from the hook 10. The hook is simply swung around to be disposed a sufficient distance above the lowermost support and the pot or kettle is then hung on the hook by its bail and since the hooked portion 10 is arranged over the outermost portion of the lower ring like utensil support it will be seen that the pot or kettle hung from the hook will be arranged on a level with or below the utensil supporting portion of the lowermost support so as not to interfere therewith or the utensil carried thereby. The invention is not limited in this respect to the co-relation of the hook and ring like support and it will be appreciated that a smaller ring like support than those illustrated can be provided and arranged very close to the stake so that a utensil carried by this relatively small support can be arranged in a position to receive full benefit of the heat from the fire in spite of the fact that it may be arranged directly above one of the larger ring like supports 7.

It is absolutely essential that each of the utensil holders embody all of the features as set forth above, in order that they may be adjusted vertically upon the stake without necessitating the camper to raise and lower said holder with his hands. In practice, it will be appreciated that the stake and utensil holders will become heated to a high degree and it is therefore impossible to take hold of the holders with the bare hand for adjusting them vertically with relation to the fire to obtain more or less heat as the case may be. Therefore, I have provided the above specific construction for my utensil holder and to illustrate the usefulness of the same when adjustment thereof is found necessary. It will be assumed that the holder is engaged with the upper portion of the stake and above the fire. The utensil is positioned upon the supporting portion of the holder in the well known manner and the contents thereof permitted to cook. If it is found that it is necessary to lower the utensil holder to dispose the same closer to the fire, the utensil may be removed, and with a stick the camper may knock upon the bottom of the utensil supporting portion of the holder which will cause the loop 6 to assume a position whereby it may readily slide a substantial distance down the stake. As set forth heretofore, the utensil engaging or supporting portion of each holder is made large and heavy so that after it has been moved upwardly by the stake it will immediately assume its original horizontal position which will of course cause the loop 6 to bind upon the stake. Consequently, it will be apparent that the utensil holder may be moved downwardly of the stake by merely shoving upwardly thereon with a stick or other implement. This adjustment is also made possible by the fact that the loops 6 of the utensil holder is slightly larger in diameter than the stake 5, and that the stake is of a uniform diameter and smooth to permit ready sliding movement of the loop 6 thereon.

The foregoing description and the accompanying drawing has reference to the preferred or approved form of my invention. It is to be understood however, that such changes may be made in the construction and combination of parts, materials, dimensions, etc., as may prove expedient and fall within the scope of the appended claims.

Having thus fully described my invention what I claim as new and desire to secure by Letters Patent is:—

1. A utensil supporting device adapted to be mounted on a stake and comprising a single strand of material having one end bent to provide a utensil support, one end of the strand forming the utensil support being directed laterally of said portion and in the same plane therewith to provide a shank, and the other end of the shank being bent to provide a loop which is disposed at an angle to the plane of the utensil support and shank and which is slightly larger in diameter than the stake.

2. A utensil supporting device adapted to be mounted on a stake and comprising a pair of rings or loops formed from a single piece of material, one loop being considerably smaller than the other and arranged at an angle to the plane thereof whereby the relatively large loop will be disposed in a horizontal plane when the smaller loop is positioned on the stake in an operative position.

3. A utensil supporting device adapted to be mounted on a stake and comprising a single strand of material bent into the shape of the numeral eight to provide a pair of loops, one of said loops being smaller in diameter than the other, and the diameter of the smaller loop being slightly larger than that of the stake, and said relatively small loop being disposed at an angle to the plane of the relatively large loop whereby the latter is arranged in a horizontal plane when the smaller loop is arranged in an operative position on the stake.

In testimony whereof I affix my signature in presence of two witnesses.

NETTIE V. TURNER.

Witnesses:
E. M. WEBSTER,
N. A. BERRY.